Figure 1:
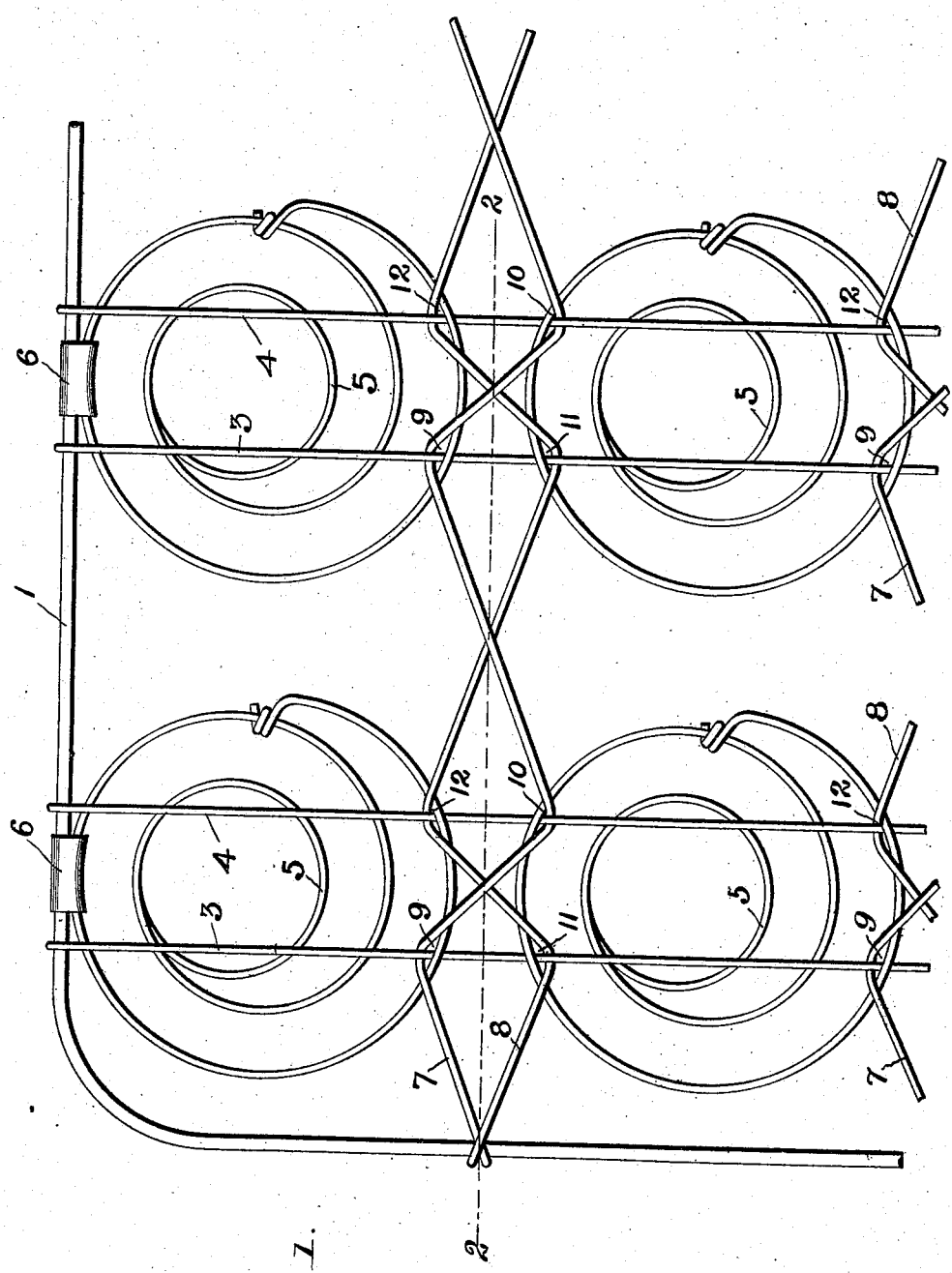

No. 854,919. PATENTED MAY 28, 1907.
T. R. WOODWARD.
SPRING FOR BEDS, SEAT BOTTOMS, &c.
APPLICATION FILED MAR. 21, 1907.

2 SHEETS—SHEET 1.

Witnesses
K. E. Montague
John A. Murphy

Inventor
T. R. Woodward
By John H. Holt
Attorney

No. 854,919. PATENTED MAY 28, 1907.
T. R. WOODWARD.
SPRING FOR BEDS, SEAT BOTTOMS, &c.
APPLICATION FILED MAR. 21, 1907.
2 SHEETS—SHEET 2.
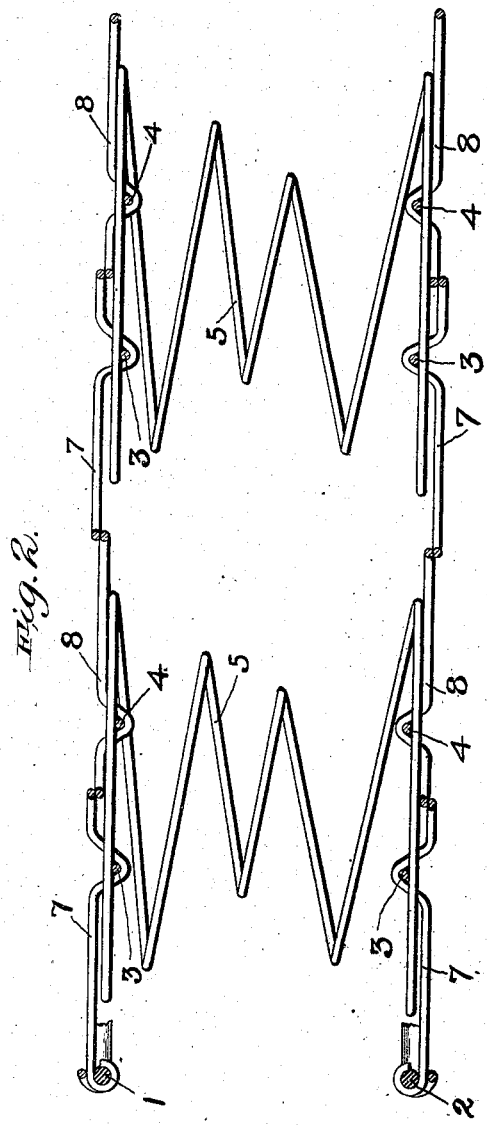
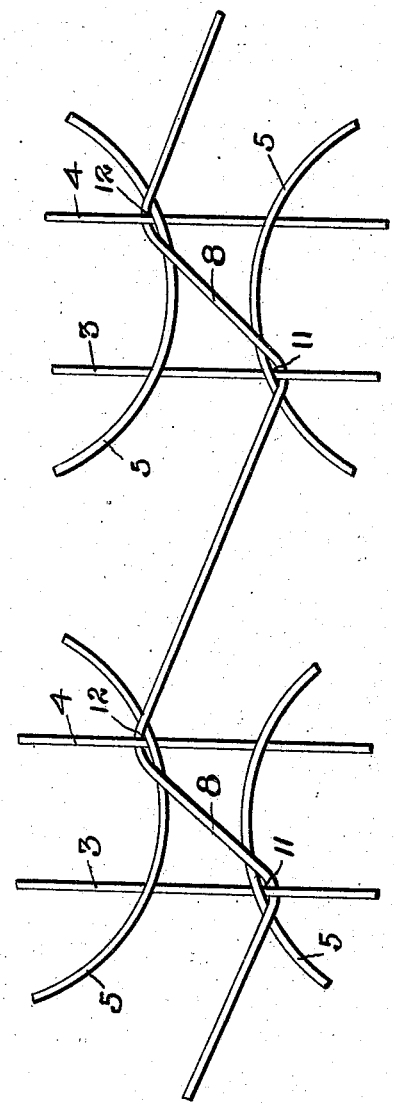
Witnesses
Inventor
T. R. Woodward

UNITED STATES PATENT OFFICE.

TOLLY ROBERT WOODWARD, OF AUGUSTA, GEORGIA.

SPRING FOR BEDS, SEAT-BOTTOMS, &c.

No. 854,919.  Specification of Letters Patent.  Patented May 28, 1907.

Application filed March 21, 1907. Serial No. 363,774.

*To all whom it may concern:*

Be it known that I, TOLLY ROBERT WOODWARD, a citizen of the United States, residing at Augusta, in the county of Richmond and State of Georgia, have invented certain new and useful Improvements in Springs for Beds, Seat-Bottoms, &c., of which the following is a specification.

In devices of this character the springs employed are usually elongated coil springs, and these are held in various ways at both ends between suitable supports. In practice such springs must be capable of withstanding strains acting in a great many different directions without being permanently displaced from their original connections and the structure must be sufficiently elastic to permit them to assume their original positions after the strains or forces have been removed.

To secure a supporting structure for the springs which will securely hold them against permanent displacement and at the same time be light in weight and simple and inexpensive in construction, has been the chief aim of spring manufacturers in recent years, and this is the aim and object of the present invention.

With this end in view my said invention consists in the novel combination and arrangement of parts herein described and more particularly pointed out in the accompanying claims.

In order to more fully describe my said invention reference will be had to the accompanying drawings wherein:—

Figure 1, is a fragmentary top plan view of one form of spring structure embodying my said invention; Fig. 2, a section taken along the line 2—2 Fig. 1, and Fig. 3, a fragmentary top plan view of a modified form of the structure shown in Fig. 1.

Referring to the accompanying drawings, 1 and 2 represent two similar superposed frames which may be of any desired shape and of any desired material though preferably of heavy wire bent to the proper shape. In the form of the invention illustrated these frames are substantially rectangular.

Extending across the respective frames, and made fast in any suitable way to opposite sides of said frames are substantially parallel pairs of supporting wires 3, 4. Mounted between superposed pairs of such wires are the coil springs 5, the said wires crossing the ends of said coils springs as shown. Each coil spring at the end of a row between superposed pairs of said supporting wires is made fast to the frames at its end coils in any suitable way as for example by the metal clips 6. Extending in a zig-zag course across the frames in a direction transverse to that of the supporting wires 3, 4, are pairs of locking stay-wires 7 and 8, made fast at their ends to opposite sides of the frames and interlocking with said springs and supporting wires at diagonally opposite points as at 9 and 10, and 11 and 12 between adjacent sides of adjacent end spring-coils crossed by a pair of said supporting wires and forming diagonal stays between such points and also between diagonally opposite points 10 and 9, 12 and 11 of engagement between adjacent wires of adjacent pairs of supporting wires 3, 4, and the end coils of the springs crossed thereby. The interlocking at such points 9, 10, 11 and 12 is effected by passing the supporting wires at these points beneath the end coils of the springs and looping the stay wires 7 and 8 over the said end coils and under the supporting wires 3, 4. The supporting wires at other points pass over the outside end of the springs as shown.

In the form of the device shown in Figs. 1 and 2, I employ what I call the double locking arrangement in which pairs of stay wires 7 and 8 are employed. I may, however, omit either the wires 7 or the wires 8 of each pair of such wires and use the single locking arrangement shown in Fig. 3.

With such arrangements for interlocking the springs and staying them it is practically impossible for the springs to become accidentally displaced. While at the same time the structure is extremely simple and may be made very light. Moreover such an arrangement presents quite a symmetrical and pleasing effect to the eye.

While I designated the members 3, 4, 7 and 8 as "wires" it will be understood that I mean to include in such term any equivalent structure, such as strips or strands of material other than metal.

Without confining myself to the specific details of construction herein shown, what I claim as my invention is:—

1. The combination with a plurality of coil springs, of a plurality of pairs of supporting wires, each pair of said supporting wires passing across the end coils of a plurality of coil springs, locking stay-wires interlocking with said springs and supporting wires at diagonally opposite points of engagement between adjacent sides of adjacent end spring-coils crossed by a pair of said supporting wires and forming diagonal stays between such points and between diagonally opposite points of engagement between adjacent wires of separate adjacent pairs of supporting wires and the end coils of the springs crossed thereby.

2. The combination with a plurality of coil springs, of a plurality of pairs of supporting wires, each pair of said supporting wires passing across the end coils of a plurality of coil springs, locking stay-wires interlocking with said springs and supporting wires at diagonally opposite points of engagement between adjacent sides of adjacent end spring-coils crossed by a pair of said supporting wires and forming crossed diagonal stays between such points and between diagonally opposite points of engagement between adjacent wires of separate adjacent pairs of supporting wires and the end coils of the springs crossed thereby.

3. The combination with a pair of frames, a plurality of pairs of supporting wires extending across said frames and made fast at their ends to the sides of said frames, a plurality of coil springs arranged in rows respectively between each pair of supporting wires of one frame and a corresponding pair of the other of said frames, the said pairs of supporting wires passing across the end coils of said springs, locking stay-wires extending across said frames in a direction transverse to said supporting wires and made fast at their ends to opposite sides of said frames, said locking stay-wires interlocking with said springs and supporting wires at diagonally opposite points of engagement between adjacent sides of adjacent end spring coils crossed by a pair of said supporting wires and forming diagonal stays between such points and between diagonally opposite points of engagement between adjacent wires of separate adjacent pairs of supporting wires and the end coils of the springs crossed thereby.

In testimony whereof I affix my signature in presence of two witnesses.

TOLLY ROBERT WOODWARD.

Witnesses:
J. V. DOWLING.
JAMES C. ACTON.